ABR
UNITED STATES PATENT OFFICE.

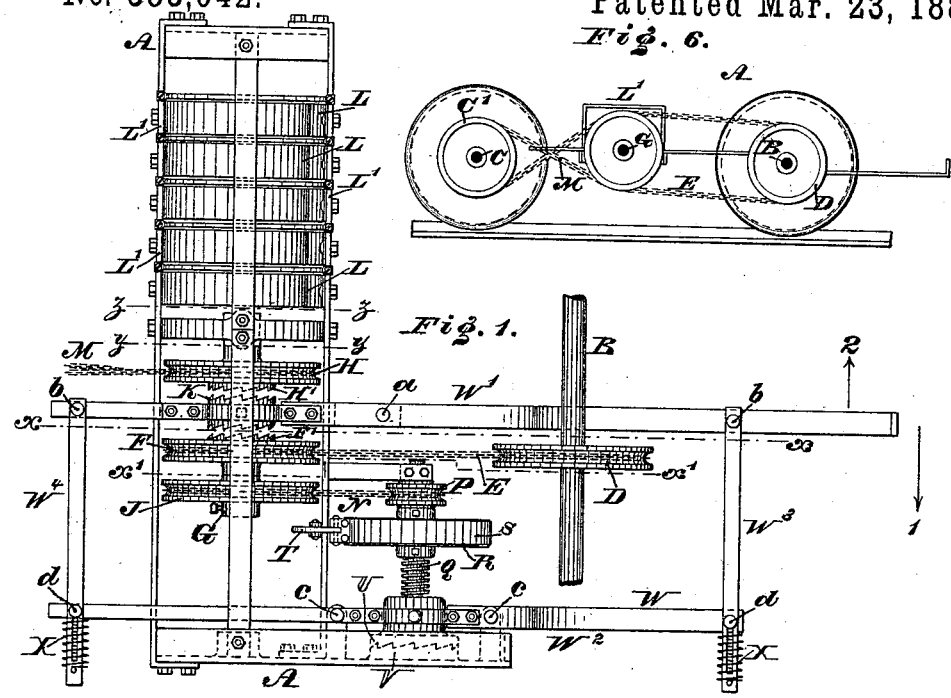

JAMES F. MORELL, OF PHILADELPHIA, PENNSYLVANIA, AND DANIEL GOFF, OF MILLVILLE, NEW JERSEY, ASSIGNORS TO THE NATIONAL CAR STARTER MANUFACTURING COMPANY OF NEW JERSEY.

CAR MOTOR AND BRAKE.

SPECIFICATION forming part of Letters Patent No. 338,642, dated March 23, 1886.

Application filed August 15, 1885. Serial No. 174,486. (No model.)

*To all whom it may concern:*

Be it known that we, JAMES F. MORELL, of the city and county of Philadelphia, State of Pennsylvania, and DANIEL GOFF, of Millville, in the county of Cumberland, State of New Jersey, both citizens of the United States, have invented a new and useful Improvement in Car Starters, Motors, and Brakes, which improvement is fully set forth in the following specification and accompanying drawings, in which—

Figure 1 represents a top or plan view of a starter and motor embodying our invention. Figs. 2 and 3 represent vertical sections in line $x\ x$, Fig. 1. Figs. 4 and 5 represent vertical sections, respectively, in lines $y\ y$ and $z\ z$, Fig. 1. Fig. 6 represents a vertical section in line $x'\ x'$, Fig. 1, on a reduced scale.

Similar letters of reference indicate corresponding parts in the several figures.

Our invention consists of a car starter or motor of novel form, the same being simple, compact, and inexpensive, as will be hereinafter set forth.

Referring to the drawings, A represents a car-truck, and B C represent the front and rear axles thereof. To the axle B is fixed a grooved pulley or drum, D, around which passes a chain, E, which also passes around a grooved pulley or drum, F, the latter being loosely fitted on a rotary shaft, G, which is mounted on the truck A, and extends parallel with the axles B C, and is intermediate thereof.

H represents a pulley loosely fitted on the shaft G, and J represents a pulley fixed to said shaft, it being noticed that the pulleys H J are on opposite sides of the pulley F.

On the shaft G is a double clutch, K, which is adapted to engage with either of the pulleys F H, it being noticed that the sides of the said pulleys have clutches F′ H′, respectively, formed thereon or secured thereto.

To the shaft G are secured coiled springs L, whose power is to be exerted on said shaft.

A chain, M, passes around the loose pulley H, and also around a pulley, C′, on the axle C, and a chain, N, passes around the fixed pulley J, and a pulley, P, on a counter-shaft, Q, the latter being mounted on the truck A, parallel with and intermediate of the axle B and shaft G. On said shaft Q is a pulley, R, which is encircled by a friction strap or brake, S, one end whereof is secured to the truck, and the other end connected with a lever or arm, T, controlled by the driver of the car. On the shaft Q is a sliding clutch, U, and on the truck is a stationary clutch, V, which is on the truck and adapted to be engaged by said clutch U. For the purpose of operating the clutches K U we employ a frame, W, which, as will be seen, consists of longitudinal side pieces, W′ W², and transverse end pieces, W³ W⁴. The piece W′ is pivoted to the truck, as at $a$, the pieces W³ W⁴ are pivoted to the piece W′, as at $b$, and the piece W² is formed in sections, the inner ends of which are jointed to the hub of the clutch U and pivoted to the truck, as at $c\ c$. The outer ends of the sections of the piece W² are pivoted to the pieces W³ W⁴ by pins $d$, it being noticed that the ends of the pieces W³ W⁴ are slotted to receive said pins and have springs X bearing against the ends of the pieces W² W³ W⁴, it being noticed that when the frame W is operated the piece W³ engages with the adjacent pin $d$ and moves the relative section of the piece W², and the opposite piece, W⁴, slides on its pin $d$ without moving the opposite section of the piece W², said section, however, being moved by the clutch U.

It will now be seen that when the car is running and it is desired to rotate the shaft G in order to wind the springs L, and thus obtain the power thereof, the driver or conductor moves the frame W, say, in the direction of arrow $l$. This, owing to the action of the piece W³ and adjacent section W², throws the clutch K into engagement with the pulley H, whereby the chain M, running from said pulley around the axle C, rotates the shaft G and winds the springs L. Simultaneously therewith the clutch U is disengaged from the clutch V, and the driver then operates the windlass or lever by which the lever or arm T is moved, the effect of which is to tighten the brake-band S against the pulley R, the effect of which is to emporarily hold said wheel, the shaft Q, the pulley P, chain N, and fixed pulley J, and consequently the shaft G, whereby the springs are held in wound condition, and their power consequently is stored for future use. The frame W is now moved so that the clutch K is clear of both clutches F' H', and the pulleys F H rotate freely on the shaft G. The clutch U returns to its normal position in contact with the clutch, thus locking the shaft Q, and consequently the pulley J, shaft G, and the springs as coiled or wound, it being noticed that the pulleys F H being free do not cause the rotation of the shaft G. When the power of the spring is required, the frame W is moved in the direction of the arrow 2, so that the clutch K engages with the pulley F, and the clutches U V are disconnected. As the pulley J is no longer controlled by the clutches U V, the springs L become operative and rotate the shaft G, and with it the pulley F, whereby power is communicated to the axle B, and the car is accordingly started or the propulsion thereof assisted.

The springs L consist of two coiled springs, one end of each of which is secured to a frame, L', which is attached to the truck A, both springs being attached to the shaft G.

If desired, the clutch K may be located on either of the axles B C, and the brake pulley or wheel R and clutch U on the shaft G.

We do not limit our invention to the starting of cars, as it is applicable to other devices where the axle B or C, or both, are rotated and it is desired to exert the power of the springs thereon.

In lieu of the chains employed, the pulley around which they pass may be geared together in any suitable manner.

As the winding of the springs resists the rotation of the shaft G, the action of the chain M is likewise resisted, the effect of which is to retard the rotation of the axle C, thus providing a brake for the latter.

Having thus described our invention, what we claim as new and desire to secure by Letters Patent, is—

1. A shaft with springs connected therewith, a double clutch on the said shaft, a loose clutch-pulley on each side of the said clutch, a fixed pulley, and chain or bands passing from said clutch-pulleys to the axles, the said parts being combined and operating substantially as and for the purpose set forth.

2. The shaft G, located about midway between the axles and having springs L, double clutch K, and pulley, in combination with the pulley P, shaft Q, and locking-clutches U and V, substantially as and for the purpose set forth.

3. The shaft G, with springs and clutch mechanism independently of each other, in combination with an adjustable frame pivoted to the truck and adapted to operate the said clutch mechanism, substantially as described.

4. The shaft G, with springs and clutch mechanism, in combination with the pulley J, fixed on said shaft, the pulley P, connection N, shaft Q, pulley R, brake S, and locking-clutches U V, substantially as and for the purpose set forth.

5. An axle and a shaft having a fixed pulley, J, loose pulleys F H, and a clutch, K, in combination with a shaft having a pulley, P, and clutch U, a clutch, V, on a frame, a connection, N, of the pulley P, with the fixed pulley J, and a connection, E or M, of the loose pulley F or H with said axle, substantially as and for the purpose set forth.

6. In a starter or motor, a clutch-moving frame consisting of the side piece W', slotted pieces $W^3$ $W^4$, spring X, and jointed side piece $W^2$, substantially as and for the purpose set forth.

7. The springs L, the shaft G, the fixed pulley J, the clutch K, with clutch-pulleys F H, the shaft Q, with clutch U, and the clutch V, in combination with the jointed side piece $W^2$, the end pieces, $W^3$ $W^4$, and side piece W', substantially as and for the purpose set forth.

JAMES F. MORELL.
DANIEL GOFF.

Witnesses:
JOHN A. WIEDERSHEIM,
A. P. GRANT.